Aug. 5, 1941.   G. A. GILLEN   2,251,674
INDUCTION MOTOR
Filed Feb. 21, 1940
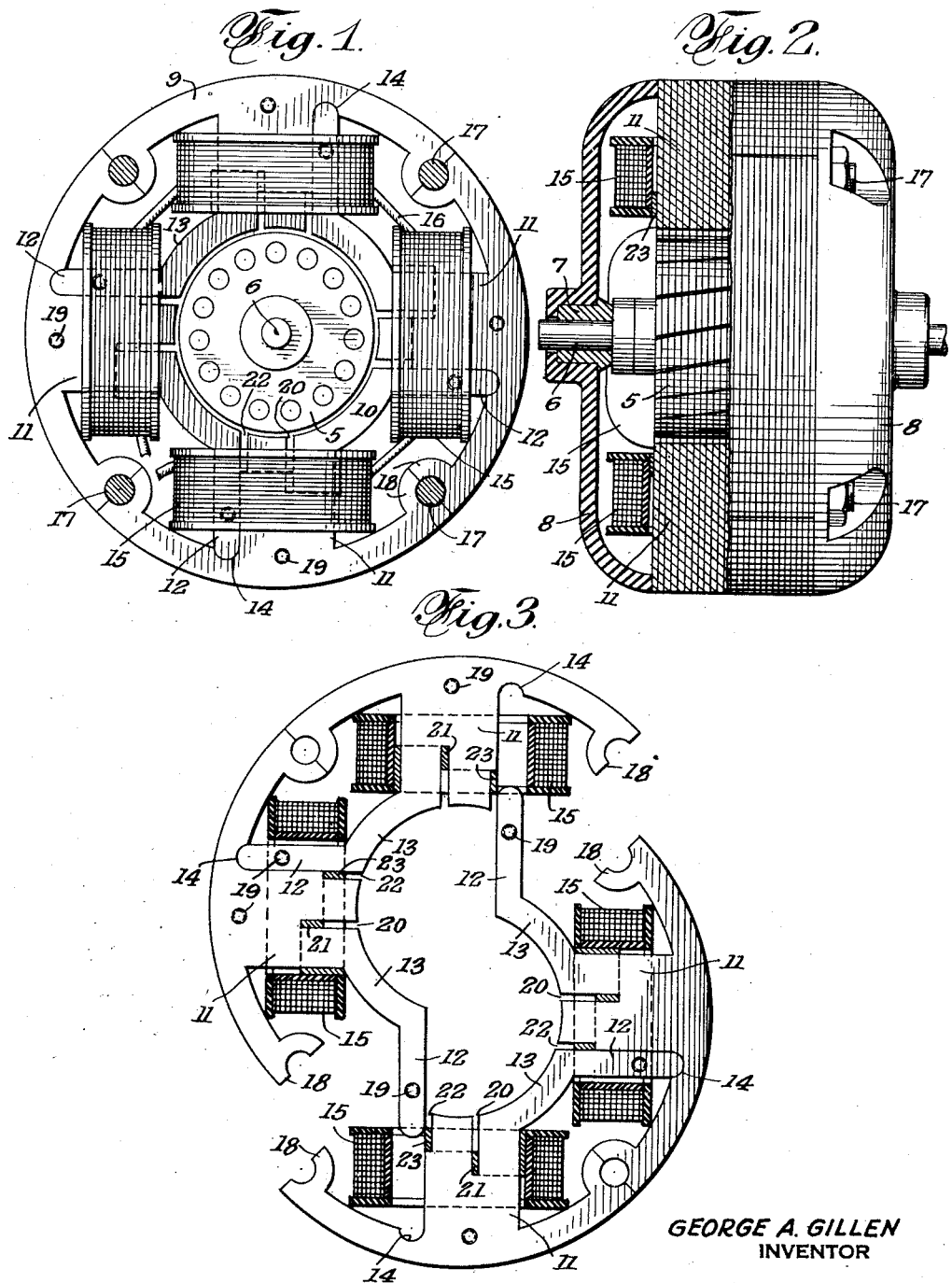
GEORGE A. GILLEN
INVENTOR Patented Aug. 5, 1941

2,251,674

UNITED STATES PATENT OFFICE 2,251,674

INDUCTION MOTOR

George A. Gillen, Bronx, N. Y., assignor to Fuel & Metal Research Corporation, Brooklyn, N. Y., a corporation of New York Application February 21, 1940, Serial No. 320,073

7 Claims. (Cl. 172—278)

The invention here disclosed relates particularly to electrical machines in the nature of induction motors.

Special objects of the invention are to provide a machine of this character of improved electrical characteristics and of simplified mechanical construction and consisting of few parts which can be produced at low cost and readily and inexpensively assembled.

Other desirable objects and the novel features of construction, combination and relation of parts by which such objects are attained will appear and are set forth in the following specification.

The drawing accompanying and forming part of the specification illustrates one practical commercial embodiment of the invention. The structure, however, may be modified and changed in various ways all within the true intent and broad scope of the invention as hereinafter defined and broadly claimed.

Figure 1 is a face view of the stator and rotor of an induction motor embodying the invention, with parts appearing in section.

Figure 2 is an edge view of the motor, with the casing and shaft bearings included and with parts broken away and appearing in section.

Figure 3 is a part sectional detail view illustrating the method of assembly of the parts.

In the machine illustrated the rotor 5 is of conventional squirrel-cage design having a shaft 6 journaled in bearings 7 carried by the casing sections 8.

The stator is composed of cooperatively associated substantially identical segments collectively forming a complete outer magnetic ring 9, a complete inner magnetic ring 10 surrounding the rotor and substantially radial poles connecting the outer and inner rings.

The poles consist in each instance of a main polar section 11 integrally connected with and forming a part of the outer magnetic ring and a lesser pole section 12 disposed at one side of the main pole section and integrally connected with and forming part of the inner magnetic ring.

In the four pole design of machine shown, the inner rotor enclosing ring is composed of four arcuate quadrant sections 13 projecting as horns from one side of each of the main pole sections and the pole sections 12 are integral sections of these horns, projecting substantially radially or, as here shown, substantially parallel with a radial line projecting centrally through each complete pole. This arrangement enables the four segments to be readily assembled, as shown in Figure 3, by cooperatively relating the adjoining segments in connected pairs and then slipping the two pairs together in a straight movement in the line of extension of the polar additions 12.

To confine the pole sections closely together the outer ring member is shown as having seats 14 to receive the end of the pole sections 12 and the meeting edges of which may be curved or otherwise shaped to effect a wedging engagement for forcing the sections tightly together.

Windings 15 encircle the combined pole sections. These are shown as form-wound coils of a size and shape to slip over the projecting pole section 12 and horn 13 of each main pole section 11 into the position shown at the top and at the bottom in Figure 3, and to then provide space at the hornless side of the pole section to receive the companion pole section of the adjoining segment.

In the final position the windings surround both sections of each pole so that maximum electrical coaction between the windings and poles is attained with minimum magnetic reluctance and the coils are fully held in place between the inner and outer rings, requiring no fastenings or ties. The several coils may be connected as indicated at 16, or otherwise, to accomplish the effects desired in the machine.

The stator segments are suitably secured together, in the present disclosure, by bolts 17 extending through mating hole sections 18 at the ends of the segments. The laminations composing each segment are shown as secured together by rivets 19.

Shading coils may be used. In the illustration the main pole sections are slotted inwardly at 20 to receive one loop 21 of a shading coil and the hornless side of the pole section is shouldered at 22 to take the other loop 23 of a compound shading coil. These shading coils can be made up in final form and slipped into position over the horns of the pole sections before the windings are placed in position.

What is claimed is:

1. In an electrical machine of the character disclosed, the combination of a rotor and stator, said stator being constructed to permit use of preformed field coils and comprising cooperatively connected stator segments collectively forming an inner magnetic ring completely surrounding the rotor, a complete outer magnetic ring and poles connecting said inner and outer magnetic rings, said poles being split in planes substantially radial with respect to the rotor in sections disposed in side by side relation with one section connected with and forming an integral part of the outer magnetic ring and the other section connected with and forming an integral part of the inner magnetic ring and preformed windings surrounding said pole sections and disposed between said inner and outer magnetic rings, the pole section which is integrally connected to the inner ring being integrally connected with the corresponding other section of an adjacent pole.

2. In an electrical machine of the character disclosed, the combination of a rotor and stator, said stator comprising cooperatively connected stator segments collectively forming an inner magnetic ring completely surrounding the rotor, a complete outer magnetic ring and poles connecting said inner and outer magnetic rings, said poles being split substantially radially in sections disposed in side by side relation with one section connected with and forming an integral part of the outer magnetic ring and the other section connected with and forming an integral part of the inner magnetic ring and windings surrounding said pole sections and disposed between said inner and outer magnetic rings, said inner ring being made up of arcuate horn extensions projecting from one side of each of the pole sections which are integral with the outer ring and the pole sections which are integral with the inner ring projecting in substantially radial relation from the ends of such horn extensions.

3. In an electrical machine of the character disclosed, the combination of a rotor and stator, said stator comprising cooperatively connected stator segments collectively forming an inner magnetic ring completely surrounding the rotor, a complete outer magnetic ring and poles connecting said inner and outer magnetic rings, said poles being split substantially radially in sections disposed in side by side relation with one section connected with and forming an integral part of the outer magnetic ring and the other section connected with and forming an integral part of the inner magnetic ring and windings surrounding said pole sections and disposed between said inner and outer magnetic rings, said inner ring being made up of arcuate horn extensions projecting from one side of each of the pole sections which are integral with the outer ring and the pole sections which are integral with the inner ring projecting in substantially radial relation from the ends of such horn extensions and said outer magnetic ring having seats at the hornless sides of said first pole sections to receive the ends of said substantially radially extending pole sections.

4. In an electrical machine of the character disclosed, the combination of a rotor and stator, said stator comprising cooperatively connected stator segments collectively forming an inner magnetic ring completely surrounding the rotor, a complete outer magnetic ring and poles connecting said inner and outer magnetic rings, said poles being split substantially radially in sections disposed in side by side relation with one section connected with and forming an integral part of the outer magnetic ring and the other section connected with and forming an integral part of the inner magnetic ring and windings surrounding said pole sections and disposed between said inner and outer magnetic rings, said inner ring being made up of arcuate horn extensions projecting from one side of each of the pole sections which are integral with the outer ring and the pole sections which are integral with the inner ring projecting in substantially radial relation from the ends of such horn extensions, said windings being form-wound coils of a size to closely surround the combined pole sections and of a shape which will pass over the integrally connected horns and pole sections into seated relation against the outer ring with space at the hornless sides of the pole sections to receive the pole sections cooperative with the first pole sections.

5. In an electrical machine of the character disclosed, the combination of a rotor and stator, said stator comprising cooperatively connected stator segments collectively forming an inner magnetic ring completely surrounding the rotor, a complete outer magnetic ring and poles connecting said inner and outer magnetic rings, said poles being split substantially radially in sections disposed in side by side relation with one section connected with and forming an integral part of the outer magnetic ring and the other section connected with and forming an integral part of the inner magnetic ring and windings surrounding said pole sections and disposed between said inner and outer magnetic rings, said stator segments being four in number and the inner ring being made up of horns projecting as arcuate quadrants from one side of each pole section integral with the outer ring to the near side of the next adjoining pole section and the pole sections which are integral with the inner ring being integral extensions at the ends of such quadrants.

6. In an electrical machine of the character disclosed, the combination of a rotor and stator, said stator being constructed to permit use of preformed field coils and comprising cooperatively connected stator segments collectively forming an inner magnetic ring completely surrounding the rotor, a complete outer magnetic ring and poles connecting said inner and outer magnetic rings, said poles being split in planes substantially radial with respect to the rotor in sections disposed in side by side relation with one section connected with and forming an integral part of the outer magnetic ring and the other section connected with and forming an integral part of the inner magnetic ring, preformed windings surrounding said pole sections and disposed between said inner and outer magnetic rings and shading coils about one section of each pole and interposed between the sections forming the pole, the pole section which is integrally connected to the inner ring being integrally connected with the corresponding other section of an adjacent pole.

7. In an electrical machine of the character disclosed, the combination of a rotor and stator, said stator comprising cooperatively connected stator segments collectively forming an inner magnetic ring completely surrounding the rotor, a complete outer magnetic ring and poles connecting said inner and outer magnetic rings, said poles being split substantially radially in sections disposed in side by side relation with one section connected with and forming an integral part of the outer magnetic ring and the other section connected with and forming an integral part of the inner magnetic ring and windings surrounding said pole sections and disposed between said inner and outer magnetic rings, said stator segments comprising four substantially similar units meeting to complete the outer ring and the pole sections which are integral with said outer ring having seats receiving the ends of the pole sections which are integral with the inner ring.

GEORGE A. GILLEN.